(12) United States Patent
Holland

(10) Patent No.: US 8,032,333 B2
(45) Date of Patent: Oct. 4, 2011

(54) HIERARCHICAL APPROACH FOR HEALTH AWARE ELECTRONIC MODULES

(75) Inventor: Steven W. Holland, St Clair, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 515 days.

(21) Appl. No.: 12/276,910

(22) Filed: Nov. 24, 2008

(65) Prior Publication Data
US 2010/0131240 A1 May 27, 2010

(51) Int. Cl.
G06F 11/00 (2006.01)
(52) U.S. Cl. .......................... 702/188; 700/9
(58) Field of Classification Search ............... 702/188, 702/57–59, 118, 121, 182–185; 700/9, 21, 700/29, 49, 108, 110, 174
See application file for complete search history.

(56) References Cited

U.S. PATENT DOCUMENTS
7,538,512 B2 * 5/2009 Discenzo ............... 318/609
* cited by examiner Primary Examiner — Edward Raymond
(74) Attorney, Agent, or Firm — John A. Miller; Miller IP Group, PLC

(57) ABSTRACT

A system and method for collecting and analyzing information from environmental occurrences that may have an adverse effect on electrical components in the vehicle. The information is passed up through a hierarchical structure to a higher level controller where the information can be used to detect the health of various electrical components and subsystems on the vehicles. The vehicle may employ sensors that are specifically provided to detect environmental disturbances or abnormal conditions on the vehicle, or may use electrical devices on the vehicle used for other purposes that have the capability of detecting such disturbances and conditions.

20 Claims, 1 Drawing Sheet

HIERARCHICAL APPROACH FOR HEALTH AWARE ELECTRONIC MODULES

BACKGROUND OF THE INVENTION

1. Field of the Invention

This invention relates generally to a system and method for monitoring the health of electrical components on a vehicle and, more particularly, to a system and method for monitoring the health of electronic components on a vehicle where sensors and other electrical devices detect abnormal environmental conditions and send information concerning the detection through a hierarchical structure to a high level controller.

2. Discussion of the Related Art

Diagnostics monitoring of various vehicle systems is an important vehicle design consideration so as to be able to quickly detect system faults, and isolate the faults for maintenance and service purposes. These vehicle systems typically employ various sub-systems, actuators and sensors, such as yaw rate sensors, lateral acceleration sensors, steering hand-wheel angle sensors, etc., that are used to help provide control of the vehicle. If any of the sensors, actuators and sub-systems associated with these systems fail, it is desirable to quickly detect the fault and activate fail-safe (fail-silent or fail-operational) strategies so as to prevent the system from improperly responding to a perceived, but false condition. It is also desirable to isolate the defective sensor, actuator or sub-system for maintenance, service and replacement purposes. Thus, it is necessary to monitor the various sensors, actuators and sub-systems employed in these systems to identify a failure.

It is a design challenge to identify the root cause of a fault and isolate the fault all the way down to the component level, or even the sub-system level, in a vehicle system. The various sub-systems and components in a vehicle system, such as a vehicle brake system or a vehicle steering system, are typically not designed by the vehicle manufacturer, but are provided by an outside source. Because of this, these components and sub-systems may not have knowledge of what other sub-systems or components are doing in the overall vehicle system, but will only know how their particular sub-system or component is operating. Thus, these outside sub-systems or components may know that they are not operating properly, but MAY not know if their component or sub-system is faulty or another sub-system or component is faulty. For example, a vehicle may be pulling in one direction, which may be the result of a brake problem or a steering problem. However, because the brake system and the steering system do not know whether the other is operating properly, the overall vehicle system may not be able to identify the root cause of that problem.

Each individual sub-system or component may issue a diagnostic trouble code indicating a problem when they are not operating properly, but this trouble code may not be a result of a problem with the sub-system or component issuing the code. In other words, the diagnostic code may be set because the sub-system or component is not operating properly, but that operation may be the result of another sub-system or component not operating properly.

Diagnostic and prognostic techniques for vehicle state of health monitoring can help forecast the occurrence of a problem in order to take preventive measures before significant loss of functionality has occurred or before damage is done. These techniques become more important for systems where the failure of the system can have critical implications for the overall system. Further, system manufacturers can help prevent their customers from being dissatisfied due to the failure of various systems by using diagnostic and prognostic techniques.

Health monitoring of vehicle components, devices and electrical systems can extend down to the chip level where electrical devices may be able to detect the occurrence of an abnormal situation, such as a high voltage spike. Generally, this information is not transmitted to other system devices and components that might benefit from such information.

A variety of environmental events are known to weaken, damage, or otherwise shorten the useful life of electronic components. For example, excessive temperatures, voltage spikes, impacts or vibration, excessive pressure, etc. are potential problems.

SUMMARY OF THE INVENTION

In accordance with the teachings of the present invention, a system and method are disclosed for collecting and analyzing information from environmental occurrences that may have an adverse effect on electrical components in the vehicle. The information is passed up through a hierarchical structure of controllers to a high level controller where the information can be used to detect the health of various electrical components and sub-systems on the vehicles. The vehicle may employ sensors that are specifically provided to detect environmental disturbances or abnormal conditions on the vehicle, or may use electrical devices on the vehicle used for other purposes that have the capability of detecting such disturbances and conditions.

Additional features of the present invention will become apparent from the following description and appended claims taken in conjunction with the accompanying drawings.

DETAILED DESCRIPTION OF THE EMBODIMENTS

Figure 1:
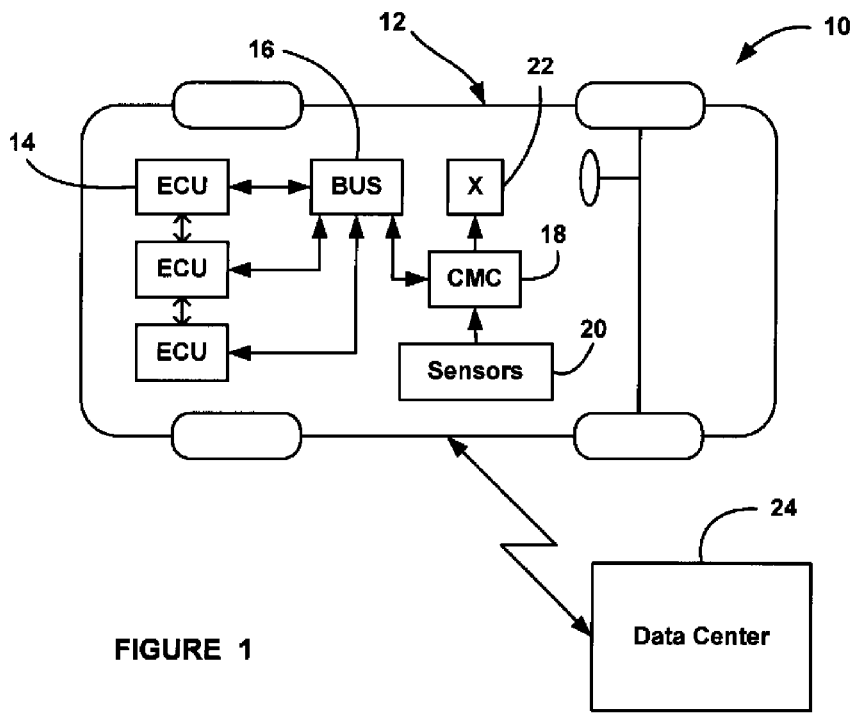
FIG. 1 is a plan view of a vehicle employing a health maintenance system for determining the health of various electronic modules, chips and devices on the vehicle.

The following discussion of the embodiments of the invention directed to a system and method for monitoring the health of electronic components and devices on a vehicle by detecting abnormal environmental disturbances and passing information about the disturbances through a hierarchical structure is merely exemplary in nature, and is in no way intended to limit the invention or its applications or uses.

The present invention provides a cost effective approach for improving the reliability and dependability of electronic devices and systems on a vehicle. Health management has become an important area in vehicle design for complex electromagnetic products and a need for effective strategies is critical for the electronic controllers and elements that make up a portion of the overall vehicle or system. Current solutions and health management techniques tend to be highly specific to the individual electronics being utilized and are thus both expensive and time consuming to implement.

A variety of environmental events are known to weaken, damage or otherwise shorten the useful life of electronic components. For example, excessive temperatures, voltage spikes, impacts, vibrations, excessive pressure, etc. can be problems. The present invention exploits the growing ubiquity of smart components, such as CPU chips, interspersed throughout the electronic modules on a vehicle to provide a technique to capitalize on available evidence of the stress that those systems where subjected to. Some electrical chips include error correction coding employing parity bits to determine errors in the chip operation.

If a vehicle is hit by a lightning strike or near a lightning strike and that lightening strike is reported as a high voltage spike on some component on the vehicle, then that information may be used by other components to assess their state of health, where multiple voltage spikes may cause a certain electronic device to fail. Similarly, static electrical discharges could cause similar problems to sensitive components. There are many examples of sensors that can detect various forms of environmental stress on electrical components and computer systems. For example, some commercially available chips detect the occurrence of overvoltage spikes in the chip, which may shorten the chips remaining useful life. This kind of knowledge is critical for evaluating the health of the component or system and needs an appropriate mechanism for being shared up the system hierarchy to an overall health manager or controller. The vehicle could also employ mechanical shock sensors, such as those that are commonly mounted on shipping containers containing fragile items to detect if G-forces from impact or vibration exceed an allowable level. If the fragile contents are exposed to excessive G-forces, they could possibly be damaged or weakened even if there is no obvious external physical evidence that the damage has occurred. For example, electrical connections could be damaged or weakened.

This invention provides an approach to capitalize on the smart elements within an electronics module and a uniform technique to share health information up through a system hierarchy, and thus, make the modules health aware. For this approach, all "smart" modules can maintain a single bit status field that captures if the module and all components beneath it are either healthy or abnormal in some manner. The health bit would be set to abnormal if any health status sensors went outside prescribed limits, such as high/low voltage, time-integrated over-voltage exposure, high/low temperatures, time integrated over-temperature, high G-level due to impact or vibration, high/low atmospheric pressure, etc. If any element in the electronics module sets the health bit to abnormal, that bit would automatically propagate to higher levels. Any module setting the health bit should preferably allow queries to determine the specific nature of the abnormality and its point of origin. In addition to physical stresses, the same bit may also be set to flag the results of embedded software diagnostic tests. This information about environmental stresses which a given system is exposed to can be very valuable in understanding the root cause when system problems are detected in the future. For example, a processor chip which had been exposed to multiple over-voltage spikes would be known to have weakened and possibly in need of replacement should operational problems arise.

The present invention can use a standardized health bit at the chip level and also at the board and module outputs across an entire vehicle sub-system. This provides a technique to automatically roll up the triggered health bit to higher levels of the control system in a simple straight forward manner. The designer has the choice of letting the health bit be passive or active such that the presence of the health bit need not interfere with the modules that choose not to use the information. The present invention also contemplates the inclusion of a comprehensive set of physical environmental factors to be sensed as such sensors become economical to provide. The concept includes the use of smart components, such as CPU chips embedded in the system as stand-ins or surrogates for the other non-smart components, which are simultaneously being stressed by the same adverse physical factors. The present invention also provides the ability to ignore health ready components or to provide a means to actively query the smart elements for additional information to define what kind of problem has been detected.

FIG. 1 is an illustration of a vehicle health management system 10 of the type discussed above including a vehicle 12. The vehicle 12 includes a number of electronic modules, electronic controllers, electronic sub-systems, electronic devices, chips, etc., represented generally as ECUs 14. The ECUs 14 may be in communication with each other and/or may be in communication with an electrical bus 16. The vehicle 12 also includes a central maintenance computer (CMC) 18 that receives information from the ECUs 14 and/or the electrical bus 16 concerning environmental stress occurrences and other information that are detectable by the ECUs 14, and trouble or fault codes that may indicate a problem with any or all of the ECUs 14, including reducing the life of the ECUs 14.

The vehicle 12 also includes sensors 20 intended to represent one or more sensors on the vehicle 12 that are able to detect environmental stress conditions, such as lightening strikes, high voltage occurrences, vibrations, high G-forces, excessive temperatures, etc., and transmit that information to the electrical bus 16 and/or directly to the CMC 18, which can then use the information to determine how it would affect other components on the vehicle 12, including whether they are damaged or impacted in anyway. The sensor 20 can be a regular vehicle sensor or chip used for a specific vehicle purpose, such as a yaw rate sensor, that has the capability of also detecting abnormal environmental occurrences, such as voltage spikes. Additionally, the sensor 20 can be a specific sensor provided on the vehicle to detect for the various environmental disturbances and occurrences referred to above. Further, the vehicle 12 may include a transmission device 22 that is able to transmit the data received by the CMC 18 telematically to a data center 24 for further processing of the information for health maintenance purposes.

Figure 2:
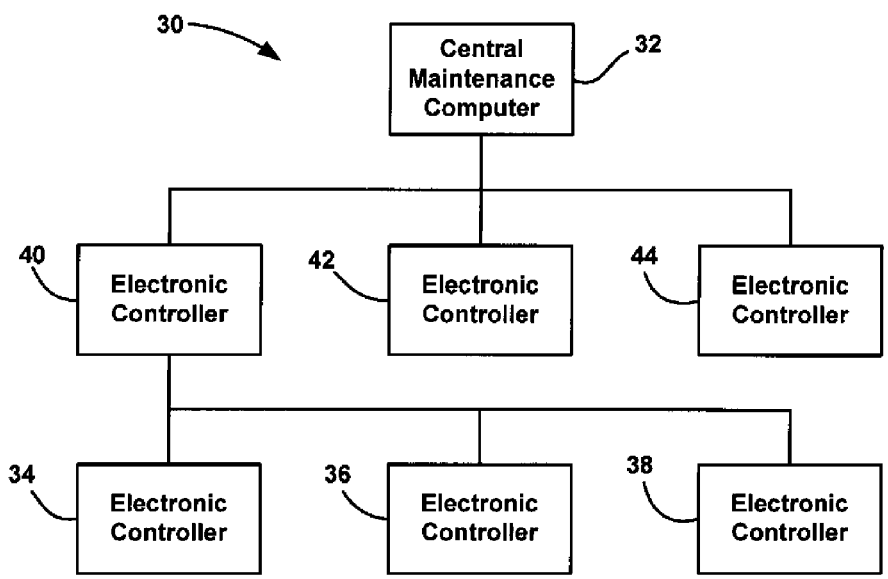
FIG. 2 is a hierarchical structure diagram showing information being transmitted from small electronic components to a high level central maintenance computer.

FIG. 2 is a block diagram of a hierarchical structure 30 showing how various components on the vehicle 12 can be interconnected so that the CMC 18 is able to monitor the health of all of the electronic components on the vehicle 12. The system 30 includes a central maintenance computer 32 representing the CMC 18. The system 10 also includes electronic controllers 34, 36 and 38 representing low level electronic devices, such as chips, sensors, detectors, devices, etc. The electronic controllers 34, 36 and 38 may have the capability to determine when an environmental stress or other abnormal situation has occurred, such as those referred to above. The electronic controllers 34, 36 and 38 may be electrically coupled to an electronic controller 40 at a higher or intermediate level, which may be a sub-system, such as a brake system, chassis system, etc, or maybe electrically coupled to other intermediate controllers 42 and 44. In one embodiment, the electronic module 34, 36 or 38 will set a health bit indicating a problem has occurred, which is passed up to the electronic module 40. The electronic controller 40 will then detect a fault signal from the electronic controllers 34, 36 and 38, such as the health bit, provide desirable processing, and pass the information up to the central maintenance computer 32. In this manner, any electrical device that detects a particular abnormal occurrence can pass that information up through hierarchical structure 30 so that the information can be used to assess the health of other devices and components on the vehicle that did not detect the abnormal occurrence.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for monitoring the health of electrical components on a vehicle, said method comprising:
    detecting an environmental stress occurrence on an electronic component on the vehicle;
    generating a stress signal by the component identifying the environmental stress occurrence;
    passing the stress signal from the electronic component to another electronic component on the vehicle in a hierarchical manner where the another electronic component receives stress signals from a plurality of electronic components; and
    passing the environmental stress signal from the another electronic component to a central maintenance computer that monitors the health of many electronic components in a hierarchical manner.

2. The method according to claim 1 wherein detecting an environmental stress occurrence includes detecting an environmental stress occurrence by a sensor or detector on the vehicle that is specifically provided to detect for such occurrences.

3. The method according to claim 1 wherein detecting an environmental stress occurrence includes detecting an environmental stress occurrence by a sensor or detector that is used for a different vehicle application, but also has the capability of detecting environmental stresses.

4. The method according to claim 1 wherein detecting an environmental stress occurrence includes detecting excessive temperatures.

5. The method according to claim 1 wherein detecting an environmental stress occurrence includes detecting voltage spikes.

6. The method according to claim 1 wherein detecting an environmental stress occurrence includes detecting an impact.

7. The method according to claim 1 wherein detecting an environment stress occurrence includes detecting a vibration.

8. The method according to claim 1 wherein detecting an environment stress occurrence includes detecting an excessive pressure.

9. The method according to claim 1 wherein the environment stress occurrence does not cause the electronic component to fail.

10. The method according to claim 1 wherein the stress signal is a health bit.

11. A method for monitoring the health of electrical components on a vehicle, said method comprising:
    detecting an environmental stress occurrence by a sensor or detector on the vehicle that is specifically provided to detect for such occurrences;
    generating a stress signal by the sensor or detector identifying the environmental stress occurrence; and
    passing the stress signal from the electronic component to another electronic component on the vehicle in a hierarchical manner where the another electronic component receives stress signals from a plurality of electronic components.

12. The method according to claim 11 further comprising passing the environmental stress signal from the another electronic component to a central maintenance computer that monitors the health of many electronic components in a hierarchical manner.

13. The method according to claim 11 wherein detecting an environmental stress occurrence includes detecting one or more of excessive temperature, voltage spikes, impacts, vibrations and excessive pressure.

14. The method according to claim 11 wherein the environment stress occurrence does not cause the electronic component to fail.

15. A system for monitoring the health of electrical components on a vehicle, said system comprising:
    means for detecting an environmental stress occurrence on an electronic component on the vehicle;
    means for generating a stress signal by the component identifying the environmental stress occurrence;
    means for passing the stress signal from the electronic component to another electronic component on the vehicle in a hierarchical manner where the another electronic component receives stress signals from a plurality of electronic components; and
    means for passing the environmental stress signal from the another electronic component to a central maintenance computer that monitors the health of many electronic components in a hierarchical manner.

16. The system according to claim 15 wherein the means for detecting an environmental stress occurrence includes a sensor or detector on the vehicle that is specifically provided to detect for such occurrences.

17. The system according to claim 15 wherein the means for detecting an environmental stress occurrence includes a sensor or detector that is used for a different vehicle application, but also has the capability of detecting environmental stresses.

18. The system according to claim 15 wherein the means for detecting an environmental stress occurrence detects one or more of excessive temperature, voltage spikes, impacts, vibrations and excessive pressure.

19. The system according to claim 15 wherein the environment stress occurrence does not cause the electronic component to fail.

20. The system according to claim 15 wherein the stress signal is a health bit.

* * * * *